United States Patent
Capretta et al.

(10) Patent No.: US 10,152,994 B1
(45) Date of Patent: Dec. 11, 2018

(54) DATA STORAGE DEVICE CONCURRENTLY DISCONNECTING MULTIPLE VOICE COIL MOTORS FROM SPINDLE MOTOR BEMF VOLTAGE DURING UNLOAD

(71) Applicant: Western Digital Technologies, Inc., San Jose, CA (US)

(72) Inventors: Paolo Capretta, Aliso Viejo, CA (US); Brian K. Tanner, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/954,080

(22) Filed: Apr. 16, 2018

Related U.S. Application Data

(63) Continuation-in-part of application No. 15/808,719, filed on Nov. 9, 2017, now Pat. No. 9,997,182.

(51) Int. Cl.
*G11B 5/09* (2006.01)
*G11B 5/596* (2006.01)
*G11B 19/04* (2006.01)

(52) U.S. Cl.
CPC ...... *G11B 5/59694* (2013.01); *G11B 5/59605* (2013.01); *G11B 19/04* (2013.01)

(58) Field of Classification Search
None
See application file for complete search history.

(56) References Cited

U.S. PATENT DOCUMENTS

| | | | | |
|---|---|---|---|---|
| 5,261,058 A * | 11/1993 | Squires | ............... | G06F 3/0601 360/78.12 |
| 5,604,719 A * | 2/1997 | Kakimoto | ......... | G11B 11/10502 369/13.21 |
| 5,822,281 A * | 10/1998 | Yumita | ............... | G11B 7/08529 369/13.32 |
| 6,005,747 A * | 12/1999 | Gilovich | ............... | G11B 5/54 360/98.07 |
| 6,121,742 A | 9/2000 | Misso | | |
| 6,282,049 B1 * | 8/2001 | Cameron | ............... | G11B 5/54 360/75 |
| 6,512,650 B1 * | 1/2003 | Tanner | ............... | G11B 5/54 360/69 |
| 6,577,465 B1 | 6/2003 | Bennett et al. | | |
| 6,847,504 B1 | 1/2005 | Bennett et al. | | |
| 6,934,135 B1 | 8/2005 | Ryan | | |
| 6,970,319 B1 | 11/2005 | Bennett et al. | | |
| 6,987,639 B1 * | 1/2006 | Yu | ............... | G11B 5/5526 360/78.04 |

(Continued)

*Primary Examiner* — Peter Vincent Agustin

(57) ABSTRACT

A data storage device is disclosed comprising a first voice coil motor (VCM) comprising a first voice coil configured to actuate a first head over a first disk, and a second VCM comprising a second voice coil configured to actuate a second head over a second disk. The data storage device further comprises a spindle motor configured to rotate the first and second disk, wherein during a power failure the first and second disks rotating causes the spindle motor to generate a back electromotive force (BEMF) voltage. During the power failure, the BEMF voltage is applied to the first VCM and to the second VCM during a first interval. The BEMF voltage is monitored, and when the BEMF voltage falls below a first threshold, the BEMF voltage is disconnected from the first VCM and the second VCM during a second interval.

19 Claims, 7 Drawing Sheets

(56) References Cited

U.S. PATENT DOCUMENTS

| | | |
|---|---|---|
| 7,548,392 B1 | 6/2009 | Desai et al. |
| 9,165,583 B1 | 10/2015 | Beker |
| 9,997,182 B1 * | 6/2018 | Tanner .................... G11B 5/09 |
| 2001/0030826 A1 * | 10/2001 | Thia .................... G11B 5/59611 |
| | | 360/69 |
| 2004/0080858 A1 * | 4/2004 | Suzuki .................... G11B 5/54 |
| | | 360/75 |
| 2006/0056099 A1 * | 3/2006 | Hashimoto ........ G11B 5/59633 |
| | | 360/75 |
| 2010/0067138 A1 * | 3/2010 | Ooi ........................ G11B 5/54 |
| | | 360/71 |

\* cited by examiner

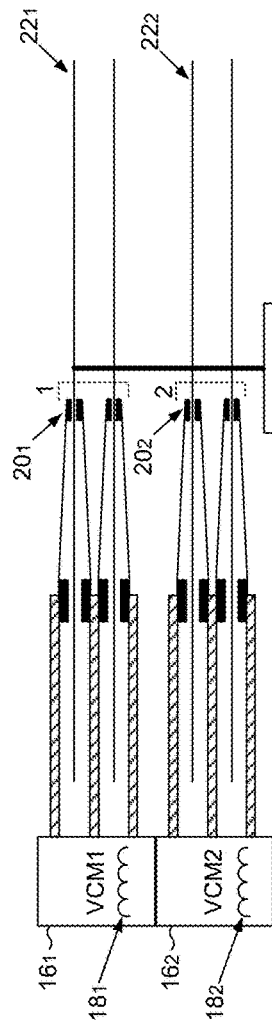
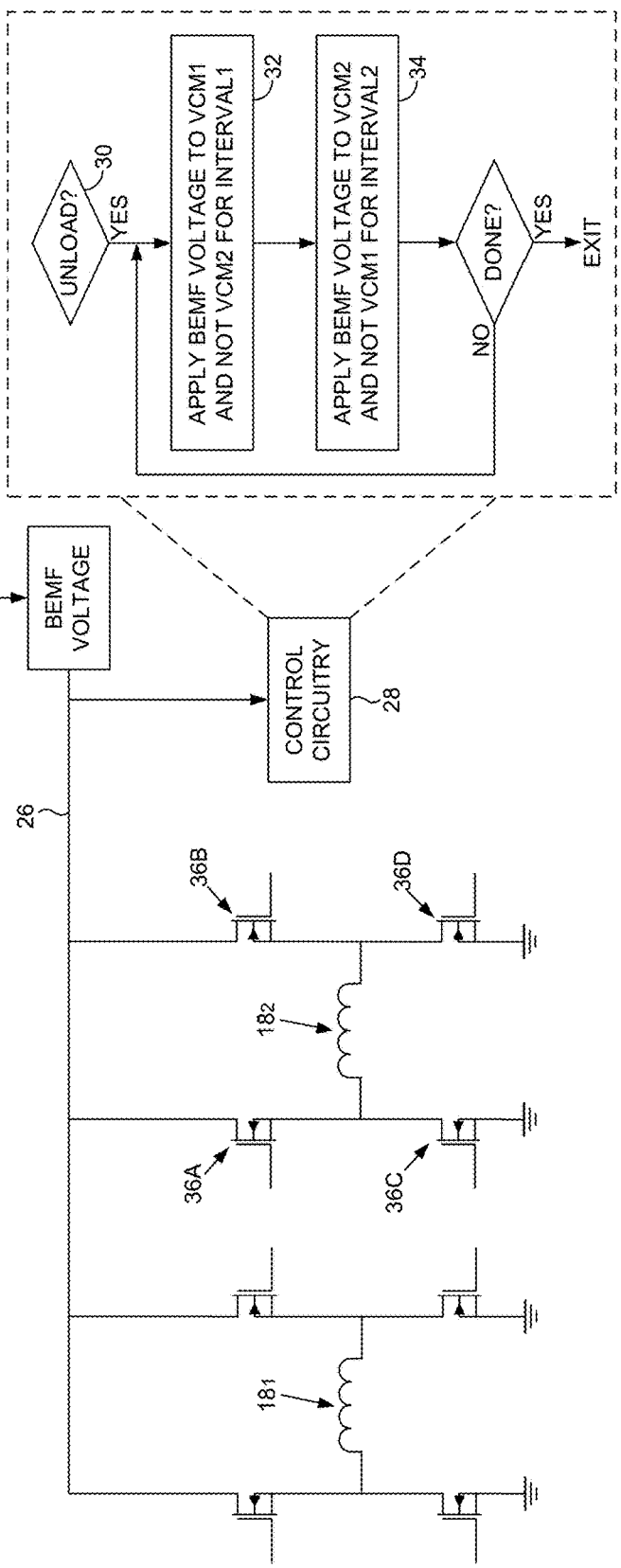
FIG. 2A
FIG. 2B

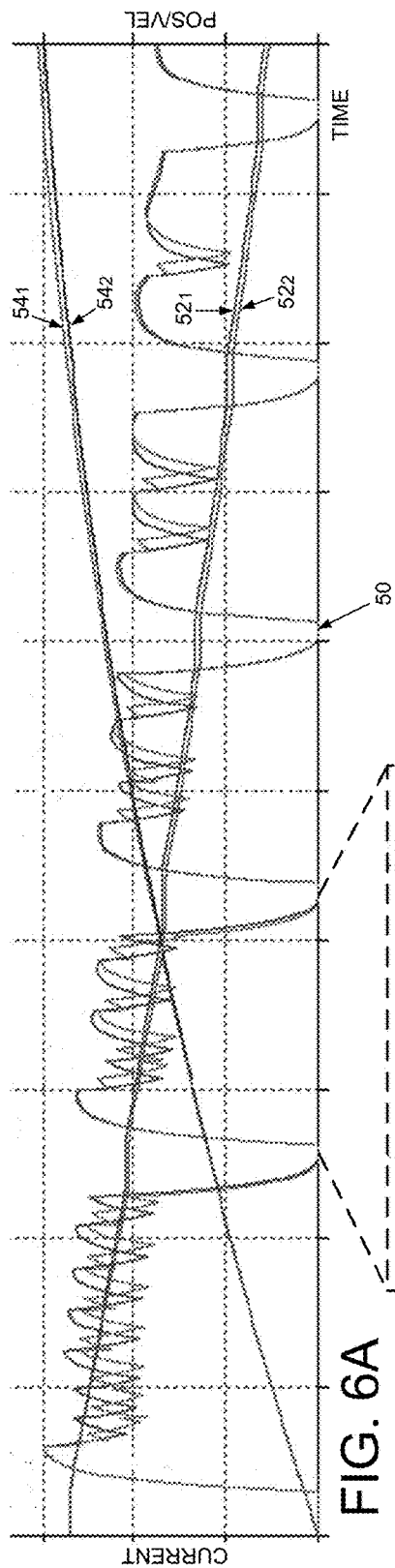
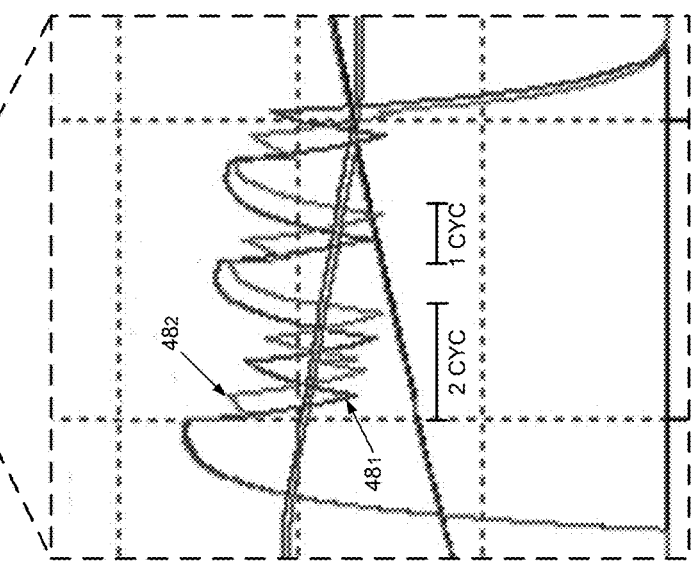

DATA STORAGE DEVICE CONCURRENTLY DISCONNECTING MULTIPLE VOICE COIL MOTORS FROM SPINDLE MOTOR BEMF VOLTAGE DURING UNLOAD

CROSS REFERENCE TO RELATED APPLICATIONS

This application is a continuation-in-part of U.S. patent application Ser. No. 15/808,719, filed on Nov. 9, 2017, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a first head actuated over a first disk by a first VCM, and a second head actuated over a second disk by a second VCM, wherein the disks are rotated by a spindle motor configured to generate a back electromotive force (BEMF) voltage during a power failure.

FIG. 2B is a flow diagram according to an embodiment wherein during a power failure the VCMs are unloaded by alternately applying the BEMF voltage to each VCM during at least part of an unload operation, thereby balancing the VCM driving currents.

FIGS. 6A and 6B show a simulation of the VCM driving currents and the position/velocity of the first and second VCM during at least part of an unload operation.

DETAILED DESCRIPTION

Figure 1:
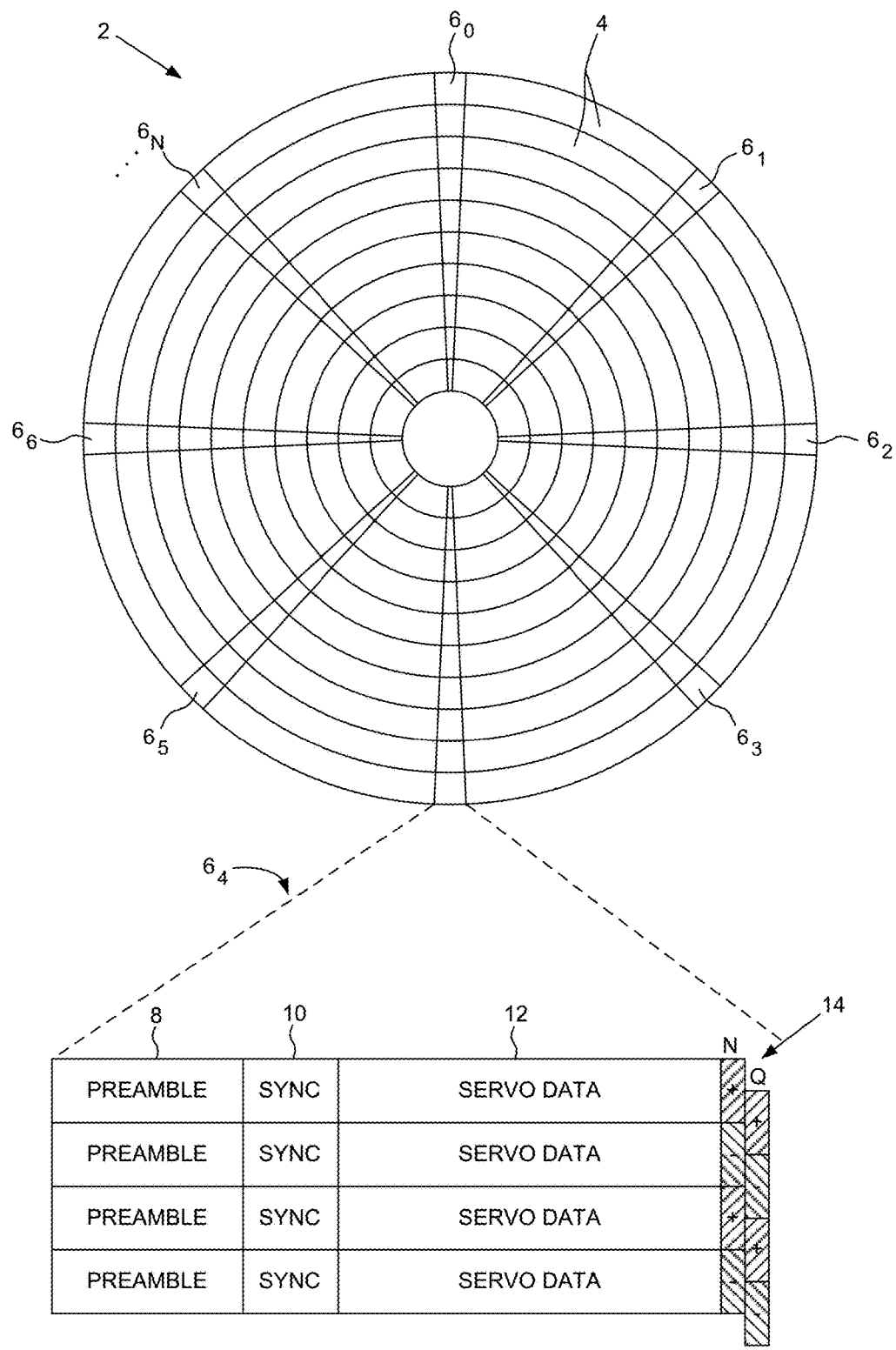
FIG. 1 shows a prior art disk format comprising a plurality of servo tracks defined by servo sectors.

FIG. 2A shows a data storage device in the form of a disk drive according to an embodiment comprising a first voice coil motor (VCM) $16_1$ comprising a first voice coil $18_1$ configured to actuate a first head $20_1$ over a first disk $22_1$, and a second VCM $16_2$ comprising a second voice coil $18_2$ configured to actuate a second head $20_2$ over a second disk $22_2$. The disk drive further comprises a spindle motor 24 configured to rotate the first and second disk $22_1$ and $22_2$, wherein during a power failure the kinetic rotation of the first and second disks $22_1$ and $22_2$ causes the spindle motor to generate a back electromotive force (BEMF) voltage 26. Control circuitry 28 is configured to unload the first VCM and the second VCM during the power failure (block 30) by executing the flow diagram of FIG. 2B, wherein during a first interval the first voice coil is connected to the BEMF voltage and the second voice coil is disconnected from the BEMF voltage (block 32), and during a second interval different from the first interval the second voice coil is connected to the BEMF voltage and the first voice coil is disconnected from the BEMF voltage (block 34). The flow diagram of FIG. 2B is repeated at least once in order to alternately apply the BEMF voltage to the voice coils during the unload operation, wherein in one embodiment, alternately applying the BEMF voltage to the voice coils helps balance the VCM driving currents and may also prevent the BEMF voltage from collapsing, thereby improving the unload operation.

In the embodiment of FIG. 2A, the first VCM $16_1$ and the second VCM $16_2$ rotate respective actuator arms about a common pivot in what may be referred to as a split actuator design. In another embodiment, the first VCM and the second VCM may be separated so as to rotate respective actuator arms about independent pivots. Also in the embodiment of FIG. 2A, the disk drive comprises four disks having respective heads actuated over top and bottom disk surfaces. Other embodiments may employ a different number of head/disk combinations, and still other embodiment may employ more than two VCMs for independent actuation of one or more heads.

In the embodiment of FIG. 2A, each voice coil $18_1$ and $18_2$ is driven by an H-bridge circuit comprising a plurality of switches (e.g., switches 36A, 36B, 36C and 36D). The switches are configured by the control circuitry 28 in order to rotate the VCM in one direction or the other, thereby actuating the respective heads toward the outer diameter of inner diameter of the disk. For example, when switches 36B and 36C are turned on and switches 36A and 36D are turned off, the VCM2 may be rotated so that the heads 2 move toward the outer diameter of the disk $22_2$ toward a ramp (not shown). When a power failure occurs while the disks are spinning, the kinetic energy of the spinning disks can convert the spindle motor 24 into a power generator used to power the VCM H-bridge circuits using the BEMF voltage that builds across the windings of the spindle motor 24.

Figure 3:
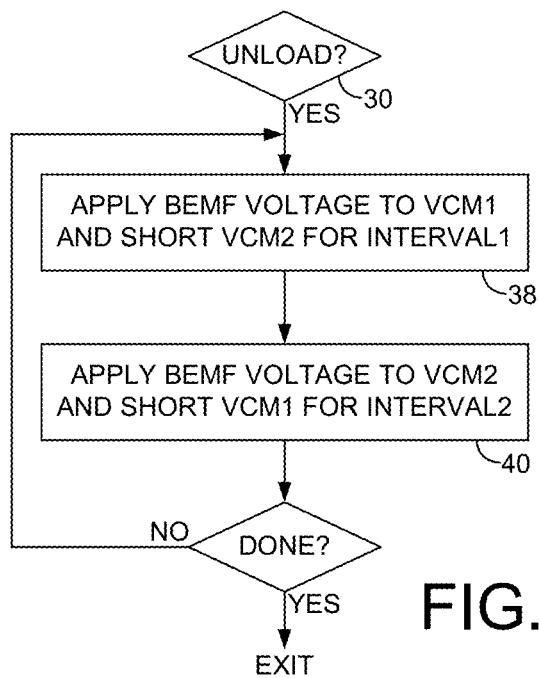
FIG. 3 is a flow diagram according to an embodiment wherein while the BEMF voltage is applied to the first VCM, the second VCM is shorted.

In one embodiment during respective intervals of the unload operation, one of the voice coils $18_1$ and $18_2$ is connected to the BEMF voltage 26 while the other voice coil is disconnected from the BEMF voltage 26 (by opening the top switches of the respective H-bridge circuit), thereby helping balance the VCM driving currents and preventing the BEMF voltage 26 from collapsing. In one embodiment shown in the flow diagram of FIG. 3, while the BEMF voltage 26 is applied to the first voice coil $18_1$ during a first interval, the second voice coil $18_2$ may be shorted, for example, by turning off the top switches and turning on the bottom switches of the H-bridge circuit (block 38). While the BEMF voltage 26 is applied to the second voice coil $18_2$ during a second interval, the first coil $18_1$ may be shorted for example, by turning off the top switches and turning on the bottom switches of the H-bridge circuit (block 40). In this embodiment, shorting the voice coil while disconnected from the BEMF voltage 26 may help maintain the current in the voice coil, thereby minimizing the transient effect in the VCM speed during the unload operation.

Figure 4:
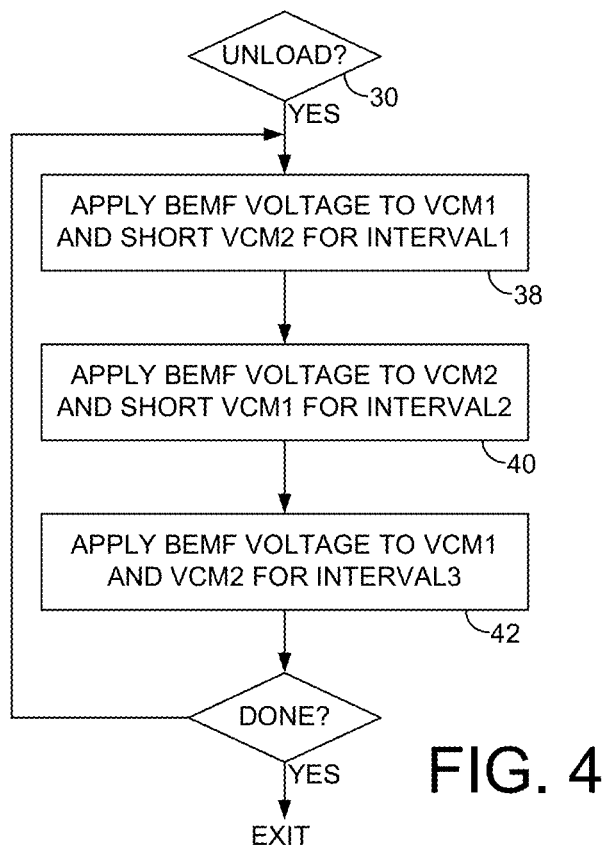
FIG. 4 is a flow diagram according to an embodiment wherein during at least part of the unload operation the BEMF voltage is applied to both VCMs.

FIG. 4 is a flow diagram according to an embodiment wherein after the BEMF voltage is applied to each voice coil individually during the first interval and second interval, respectively, the BEMF voltage is applied to both the first and second voice coil $18_1$ and $18_2$ during a third interval (block 42). This embodiment may further improve the VCM drive current balancing and also reduce the transient effect on the VCM speeds due to being periodically disconnected from the BEMF voltage. In the embodiment of FIG. 2A, the BEMF voltage 26 may be applied to both of the voice coils $18_1$ and $18_2$ by turning on the appropriate switches in the respective H-bridge circuits during the third interval.

Figure 5:
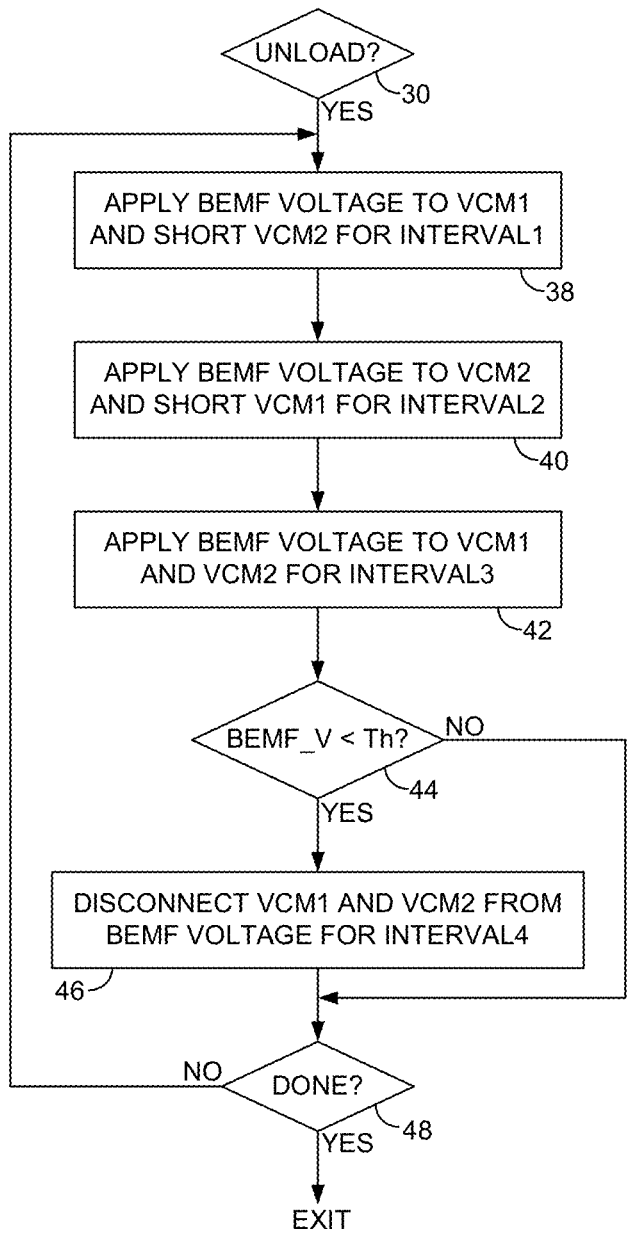
FIG. 5 is a flow diagram according to an embodiment wherein if the BEMF voltage falls below a threshold during the unload operation, the VCMs are disconnected from the BEMF voltage for an interval to allow the BEMF voltage to recover.

FIG. 5 is a flow diagram according to an embodiment wherein the BEMF voltage may be monitored by the control circuitry, and if the BEMF voltage falls below a threshold after the third interval (block 44), the first and second voice coils may be disconnected from the BEMF voltage for a fourth interval to allow the BEMF voltage to recover (block 46). In one embodiment, both the voice coils may be shorted (e.g., by turning on the lower switches of the H-bridge circuits) while both of the voice coils are disconnected from the BEMF voltage. The flow diagram of FIG. 5 is then repeated from block 38 until the unload operation is completed at block 48.

In one embodiment, the first and second voice coils may be disconnected from the BEMF voltage at block 46 of FIG. 5 for a predetermined fourth interval. In another embodiment, the predetermined fourth interval may vary over the duration of the unload operation, for example, by periodically lengthening the fourth interval since the kinetic energy of the rotating disks dissipates over time. In yet another embodiment, the first and second voice coils may be disconnected during the fourth interval until the BEMF voltage rises above a higher (hysteretic) threshold. Similarly, the durations of the first, second and/or third intervals in the embodiment of FIG. 5 may be of predetermined lengths, they may be varied over the duration of the unload operation as the kinetic energy of the rotating disks dissipates, or they may be based on threshold levels that the VCM driving currents reach. For example, in one embodiment during the first interval the first voice coil may be connected to the BEMF voltage until the VCM driving current of the first voice coil rises above a threshold, with a similar duration configured for the second interval. Both voice coils may be connected to the BEMF voltage during the third interval until either or both of the VCM driving currents rises above a threshold.

FIG. 6A shows a simulation of the VCM driving currents during part of a power failure unload operation, wherein FIG. 6B shows a magnified view for a time segment of the simulation. In FIG. 6B, graph $48_1$ represents the VCM driving current for the first voice coil $18_1$, and graph $48_2$ represents the VCM driving current for the second voice coil $18_2$. FIG. 6B shows how the respective VCM driving currents rise while connected to the BEMF voltage, and fall while disconnected from the BEMF voltage. In the example of FIG. 6B, both the first and second voice coils are connected to the BEMF voltage for an initial interval in order to "charge" both voice coils with current. The first voice coil is then disconnected from the BEMF voltage for a first interval, the second voice coil is disconnected from the BEMF voltage for a second interval, and then both the first and second voice coils are connected to the BEMF voltage for a third interval. In the example of FIG. 6B, there are two cycles of connecting one voice coil to the BEMF voltage before connecting both voice coils to the BEMF voltage, followed by multiple single cycles of connecting one voice coil to the BEMF voltage before connecting both voice coils to the BEMF voltage. However, any suitable number of cycles as well as any suitable pattern of cycles may be employed before connecting both voice coils to the BEMF voltage.

FIG. 6A also illustrates how both voice coils may be periodically disconnected from the spindle motor BEMF voltage for a fourth interval (e.g., at time 50) to allow the spindle motor BEMF voltage to recover and, in one embodiment, to measure the BEMF voltage across each voice coil in order to estimate the velocity of each VCM, thereby implementing a velocity control loop for each VCM during at least part of the unload operation. In the embodiment of FIG. 6A, both voice coils may be disconnected from the spindle motor BEMF voltage at a predetermined periodic interval, and in another embodiment, both voice coils may be disconnected from the spindle motor BEMF voltage when the spindle motor BEMF voltage falls below a threshold. The interval that both voice coils are disconnected from the spindle motor BEMF voltage may be predetermined, may vary over time, or it may extend until the spindle motor BEMF voltage rises above a higher (hysteretic) threshold. In one embodiment, each voice coil may be shorted for at least part of the interval that both voice coils are disconnected from the spindle motor BEMF voltage.

FIG. 6A also shows simulated graphs representing the position $52_1$ and $52_2$ of each VCM and the velocity $54_1$ and $54_2$ of each VCM during part of the power failure unload operation. In the example simulation of FIG. 6A, both VCMs are starting from the same position and velocity when the power failure occurs. FIG. 6A illustrates that balancing the VCM driving currents according to the above-described embodiments causes the position/velocity of the VCMs to track a desired profile, thereby improving the unload operation, as compared for example, to always connecting both voice coils to the BEMF voltage which can result in one or both VCMs failing to track the desired position/velocity profiles due to unbalanced VCM driving currents.

Figure 7A:
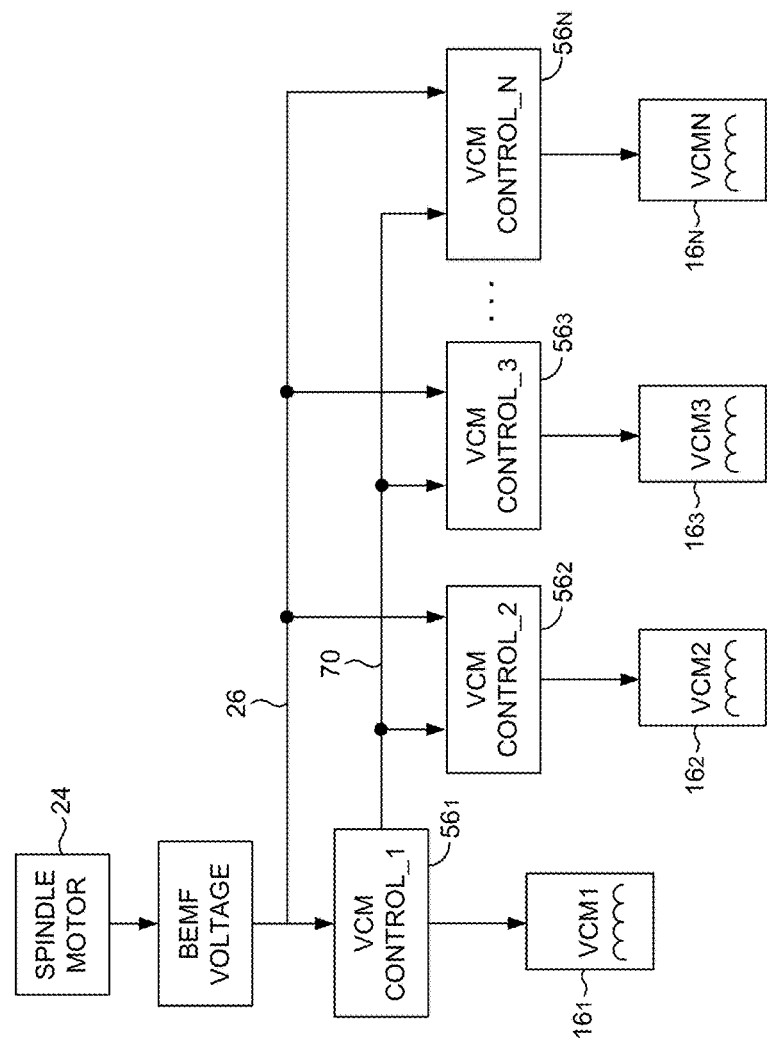
FIG. 7A shows an embodiment comprising master VCM control circuitry configured to monitor the BEMF voltage and control a respective VCM, and slave VCM control circuitry configured to control respective VCMs.
Figure 7B:
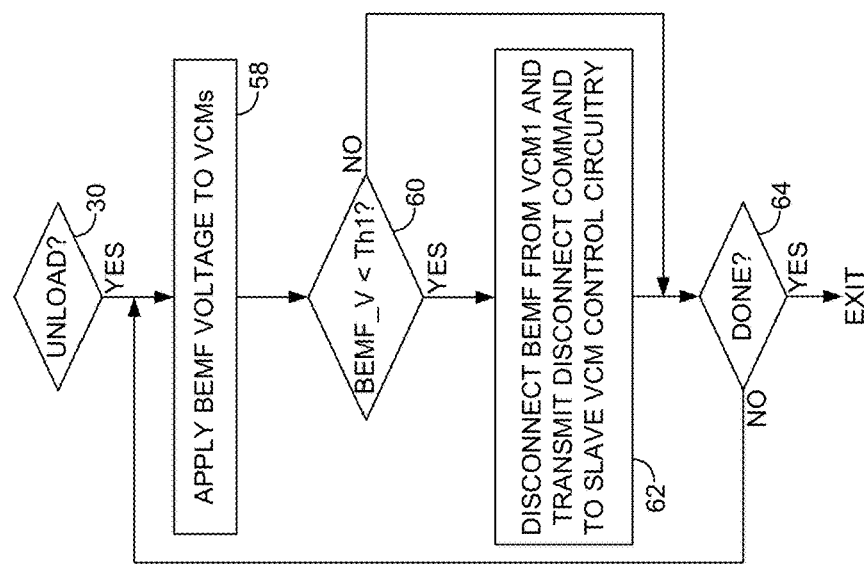
FIG. 7B is a flow diagram according to an embodiment wherein when the BEMF voltage falls below a first threshold, the master VCM control circuitry disconnects the BEMF voltage from the respective VCM and transmits a disconnect command to the slave VCM control circuitry to concurrently disconnect the BEMF voltage from their respective VCMs.

FIG. 7A shows an embodiment wherein the control circuitry comprises a master VCM control circuitry $56_1$ configured to control a respective VCM $16_1$, and a number of slave VCM control circuitry $56_2$-$56_N$ configured to control respective VCMs $16_2$-$16_N$. The master VCM control circuitry $56_1$ is further configured to monitor the BEMF voltage 26, for example by comparing the BEMF voltage 26 to a threshold. Referring to the flow diagram of FIG. 7B, during an unload operation (block 30) the BEMF voltage is concurrently applied to at least two of the VCMs during a first interval (block 58). For example, in the embodiment of FIG. 5 the BEMF voltage is concurrently applied to at least two of the VCMs at block 42. When the master VCM control circuitry $56_1$ detects the BEMF voltage falling below a first threshold (block 60), the master VCM control circuitry $56_1$ disconnects the BEMF voltage 26 from the respective VCM $16_1$, and transmits a disconnect command to each slave VCM control circuitry $56_2$-$56_N$ (block 62). In response to the disconnect command, each slave VCM control circuitry $56_2$-$56_N$ concurrently disconnects the BEMF voltage 26 from each respective VCM $16_2$-$16_N$. In one embodiment, the BEMF voltage 26 remains disconnected from the VCMs for a predetermined second interval to allow the BEMF voltage 26 to recover, and then the flow diagram is repeated starting from block 58 until the unload operation completes at block 64.

Figure 8:
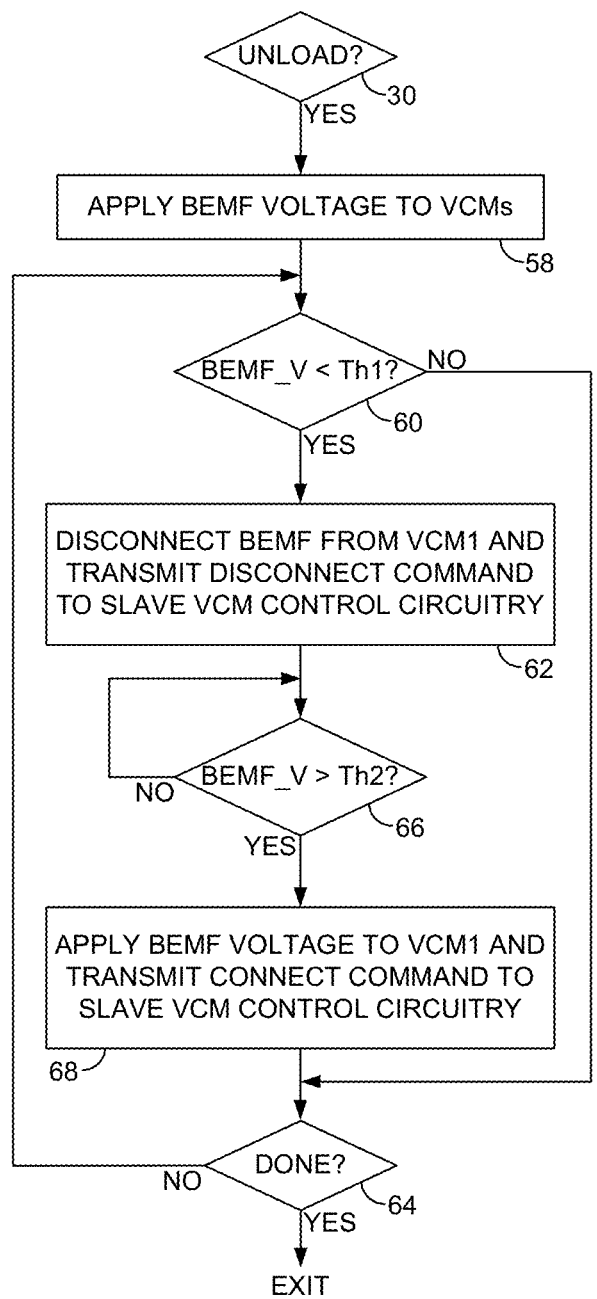
FIG. 8 is a flow diagram according to an embodiment wherein when the BEMF voltage rises above a second threshold higher than the first threshold, the BEMF voltage is reapplied to the first and second VCM.

In another embodiment shown in FIG. 8, the master VCM control circuitry $56_1$ monitors the rise in the BEMF voltage 26, and when the BEMF voltage 26 rises above a second threshold higher than the first threshold (block 66), the BEMF voltage is concurrently reapplied to at least two of the VCMs, wherein in one embodiment, the master VCM control circuitry $56_1$ transmits a connect command to each of the slave VCM control circuitry $56_2$-$56_N$ (block 68) to command each VCM control circuitry $56_2$-$56_N$ to concurrently reapply the BEMF voltage to the respective VCMs $16_2$-$16_N$. In one embodiment, the higher second threshold at block 66 implements a suitable hysteresis between the first and second thresholds which enables the BEMF voltage 26 to recover sufficiently above the first threshold before reapplying the BEMF voltage 26 to at least two of the VCMs at block 68.

In one embodiment, during the interval that the BEMF voltage is disconnected from the VCMs, the voice coil of each VCM may be shorted. Similar to the embodiments described above, in this embodiment shorting each voice coil while disconnected from the BEMF voltage may help maintain the current in the voice coil, thereby minimizing the transient effect in the VCM speed during the unload operation In one embodiment, using a master VCM control circuitry $56_1$ to monitor the BEMF voltage (e.g., by comparing the BEMF voltage to thresholds) enables the BEMF voltage to be disconnected/reconnected from/to at least two of the VCMs substantially concurrently, thereby helping to balance the power applied to each VCM during the unload operation. In contrast, if each VCM control circuitry were to monitor the BEMF voltage individually in order to disconnect/ reconnect the BEMF voltage from/to its respective VCM, the variations between the VCM control circuitry (e.g., variations between analog comparators) may result in an imbalance of power applied to each VCM due to the non-synchronous current draw from the BEMF voltage.

In one embodiment, each of the VCM control circuitry $56_1$-$56_N$ may be implemented within a respective integrated circuit (e.g., a power large scale integrated (PLSI) circuit). In one embodiment, the master VCM control circuitry $56_1$ comprises a comparator for comparing the BEMF voltage to the first and second thresholds. In one embodiment, when the BEMF voltage falls below the first threshold, the master VCM control circuitry $56_1$ transmits the disconnect command to the slave VCM control circuitry $56_2$-$56_N$ by toggling a binary state over a single transmission line 70 (FIG. 7A). When the BEMF voltage rises above the second threshold, the master VCM control circuitry $56_1$ transmits the connect command to the slave VCM control circuitry $56_2$-$56_N$ by toggling the binary state over the single transmission line 70. This embodiment helps minimize any transport delay in transmitting the disconnect/connect command from the master VCM control circuitry $56_1$ to each slave VCM control circuitry $56_2$-$56_N$. In other embodiments, the disconnect/connect commands may be transmitted over an existing interface, such as an existing serial interface used to communicate other commands between the VCM control circuitry.

In the above-described embodiments, a power failure may be detected in any suitable manner, such as by detecting when a supply voltage received from a host falls below a predetermined threshold. In one embodiment, a power failure may be detected when the supply voltage remains below the threshold for a predetermined interval in order to filter out transients in the supply voltage not due to a power failure. The control circuitry 28 may implement any suitable servo control algorithm in order to execute the unload operation during a power failure. For example, the control circuitry 28 may implement a suitable proportional control, proportional-integral control, or proportional-integral-derivative control. In addition, the control circuitry 28 may change the control algorithm at different intervals of the unload operation, for example, by employing a proportional control while accelerating the VCMs toward a target velocity at the beginning of the unload operation, and then employing a proportional-integral control to maintain the VCMs at the target velocity until the heads are unloaded onto the ramp.

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first voice coil motor (VCM) comprising a first voice coil configured to actuate a first head over a first disk;
   a second VCM comprising a second voice coil configured to actuate a second head over a second disk;
   a spindle motor configured to rotate the first and second disk, wherein during a power failure the first and second disks rotating causes the spindle motor to generate a back electromotive force (BEMF) voltage; and
   control circuitry configured to unload the first VCM and the second VCM during the power failure by at least:
      applying the BEMF voltage to the first VCM and to the second VCM during a first interval;
      monitoring the BEMF voltage; and
      when the BEMF voltage falls below a first threshold, disconnecting the BEMF voltage from the first VCM and the second VCM during a second interval.

2. The data storage device as recited in claim 1, wherein the control circuitry is further configured to unload the first VCM and the second VCM during the power failure by shorting the first voice coil and the second voice coil during the second interval.

3. The data storage device as recited in claim 1, wherein during the second interval when the BEMF voltage rises above a second threshold the control circuitry is further configured to unload the first VCM and the second VCM during the power failure by reapplying the BEMF voltage to the first VCM and the second VCM during a third interval.

4. The data storage device as recited in claim 3, wherein the first threshold equals the second threshold.

5. The data storage device as recited in claim 3, wherein the second threshold is higher than the first threshold.

6. The data storage device as recited in claim 1, wherein the control circuitry comprises:
   first VCM control circuitry configured to apply the BEMF voltage to the first VCM; and
   second VCM control circuitry configured to apply the BEMF voltage to the second VCM,
   wherein the first VCM control circuitry is further configured to:
      compare the BEMF voltage to the first threshold; and
      when the BEMF voltage falls below the first threshold, disconnect the BEMF voltage from the first VCM and transmit a disconnect command to the second VCM control circuitry,
   wherein the second VCM control circuitry is further configured to disconnect the BEMF voltage from the second VCM in response to the disconnect command received from the first VCM control circuitry.

7. The data storage device as recited in claim 6, wherein the first VCM control circuitry is configured to transmit the disconnect command to the second VCM control circuitry by toggling a binary state over a single transmission line.

8. The data storage device as recited in claim 7, wherein the first VCM control circuitry is configured to toggle the binary state over the single transmission line in order to command the second VCM control circuitry to reapply the BEMF voltage to the second VCM.

9. Control circuitry for use in a data storage device, the control circuitry comprising:
   first VCM control circuitry configured to apply a BEMF voltage to a first voice coil motor (VCM) configured to actuate a first head over a first disk, wherein the BEMF voltage is generated by a spindle motor; and
   second VCM control circuitry configured to apply the BEMF voltage to a second VCM configured to actuate a second head over a second disk,
   wherein the first VCM control circuitry is further configured to:
      compare the BEMF voltage to a first threshold; and
      when the BEMF voltage falls below the first threshold, disconnect the BEMF voltage from the first VCM and transmit a disconnect command to the second VCM control circuitry,
   wherein the second VCM control circuitry is further configured to disconnect the BEMF voltage from the second VCM in response to the disconnect command received from the first VCM control circuitry.

10. The control circuitry as recited in claim 9, wherein the first VCM control circuitry is further configured to transmit the disconnect command to the second VCM control circuitry by toggling a binary state over a single transmission line.

11. The data storage device as recited in claim 10, wherein the first VCM control circuitry is further configured to toggle the binary state over the single transmission line in order to command the second VCM control circuitry to reapply the BEMF voltage to the second VCM.

12. A method of operating a data storage device, the method comprising:
   applying a BEMF voltage generated by a spindle motor to a first voice coil motor (VCM) comprising a first voice coil and a second VCM comprising a second voice coil during a first interval, wherein the spindle motor is configured to rotate a first disk and a second disk;
   monitoring the BEMF voltage; and
   when the BEMF voltage falls below a first threshold, disconnecting the BEMF voltage from the first VCM and the second VCM during a second interval.

13. The method as recited in claim 12, further comprising shorting the first voice coil and the second voice coil during the second interval.

14. The method as recited in claim 12, wherein during the second interval when the BEMF voltage rises above a second threshold, further comprising reapplying the BEMF voltage to the first VCM and the second VCM during a third interval.

15. The method as recited in claim 14, wherein the first threshold equals the second threshold.

16. The method as recited in claim 14, wherein the second threshold is higher than the first threshold.

17. The method as recited in claim 12, further comprising:
   when the BEMF voltage falls below the first threshold,
      disconnecting the BEMF voltage from the first VCM and transmitting a disconnect command to VCM control circuitry configured to apply the BEMF voltage to the second VCM; and
   disconnecting the BEMF voltage from the second VCM in response to the received disconnect command.

18. The method as recited in claim 17, further comprising transmitting the disconnect command to the VCM control circuitry by toggling a binary state over a single transmission line.

19. The method as recited in claim 18, further comprising toggling the binary state over the single transmission line in order to command the VCM control circuitry to reapply the BEMF voltage to the second VCM.

* * * * *